Nov. 29, 1949     B. STECHBART     2,489,829
INTERMITTENT STRIP FEED MECHANISM
OF THE RECIPROCATING TYPE

Filed Oct. 23, 1947     2 Sheets-Sheet 1

INVENTOR.
BRUNO STECHBART
BY Robert F. Miehle
ATTY.

Nov. 29, 1949  B. STECHBART  2,489,829
INTERMITTENT STRIP FEED MECHANISM
OF THE RECIPROCATING TYPE
Filed Oct. 23, 1947  2 Sheets-Sheet 2
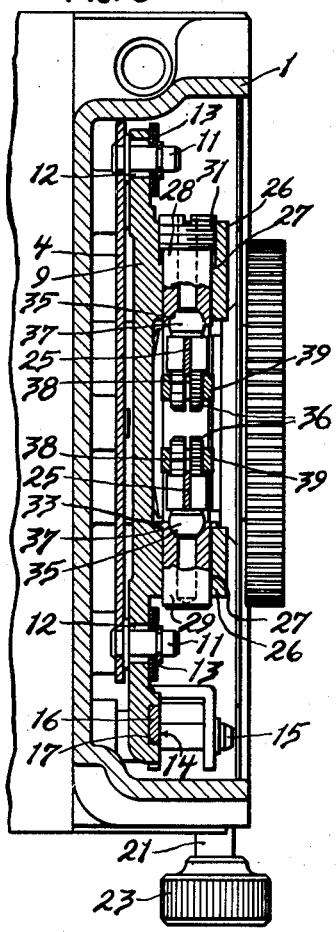
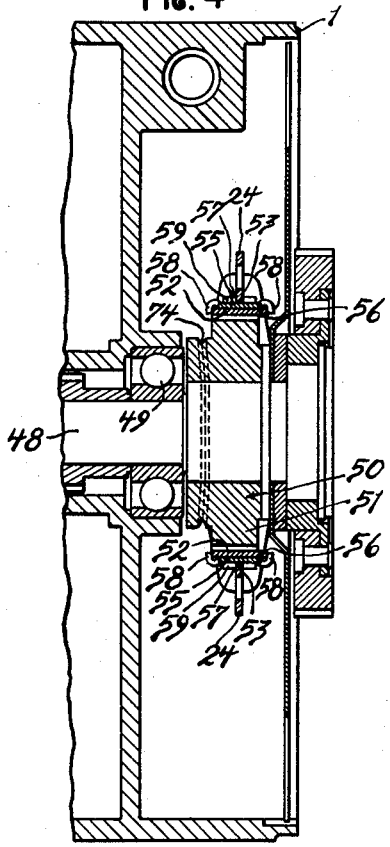
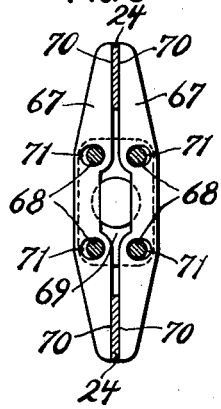
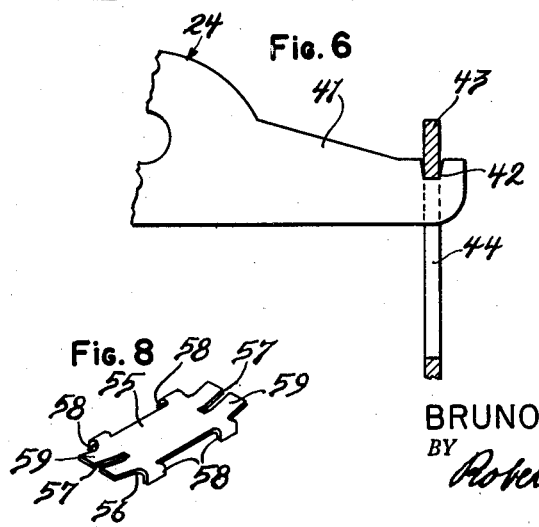
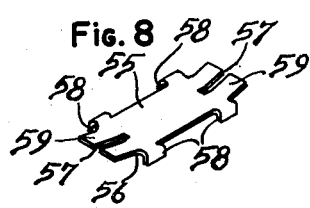
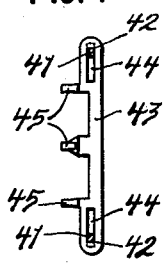
INVENTOR.
BRUNO STECHBART
BY Robert F. Miehle, Jr.
ATTY.

Patented Nov. 29, 1949

2,489,829

UNITED STATES PATENT OFFICE 2,489,829

INTERMITTENT STRIP FEED MECHANISM OF THE RECIPROCATING TYPE

Bruno Stechbart, Park Ridge, Ill., assignor to Bell & Howell Company, Chicago, Ill., a corporation of Illinois Application October 23, 1947, Serial No. 781,557

14 Claims. (Cl. 88—18.4)

My invention relates particularly to intermittent strip feed mechanisms such as is used in motion picture machines for intermittently feeding motion picture film although not limited to this use alone.

Objects of the invention reside in the provision of intermittent strip feed mechanism which is particularly adapted for feeding motion picture film, which is accurate in feeding, which is comparatively quiet in operation, which is adapted to retain its accuracy and quietness throughout a long period of use, which, involving a rotary actuating member such as a cam, provides for an extremely long wearing bearing member or members having bearing engagement with the actuating member, which is adapted for economical manufacture, which provides for assembly and service adjustment of the mechanism to provide close fitting of operating parts without necessitating close tolerances in manufacture, which provides for adjustment of the length of the feeding movement of the mechanism, and which provides for longitudinal bodily adjustment of the feeding movement of the mechanism for "framing" in the case of feeding motion picture film in a projecting machine.

With these objects in view my invention consists in certain features of novelty in the construction, combination and arrangement of parts by which the said objects and certain other objects, hereinafter appearing, are effected, all as fully described with reference to the accompanying drawing and more particularly pointed out in the appended claims.

In the said drawing—

Figure 3 is a partial sectional view taken substantially on the line 3—3 of Figure 1;

Figure 4 is a partial sectional view taken substantially on the line 4—4 of Figure 1;

Figure 5 is a partial sectional view taken substantially on the line 5—5 of Figure 1;

Figure 6 is a partial view in partial section showing a reciprocating arm and feed shuttle connection of the mechanism, hereinafter described;

Figure 7 is a partial view in partial section of the feed shuttle and the connections thereof with the reciprocating arms of the mechanism taken at a right angle to Figure 6, hereinafter described; and Figure 8 is a perspective view of one of the bearing retainer clips of the mechanism, hereinafter described.

Figure 1:
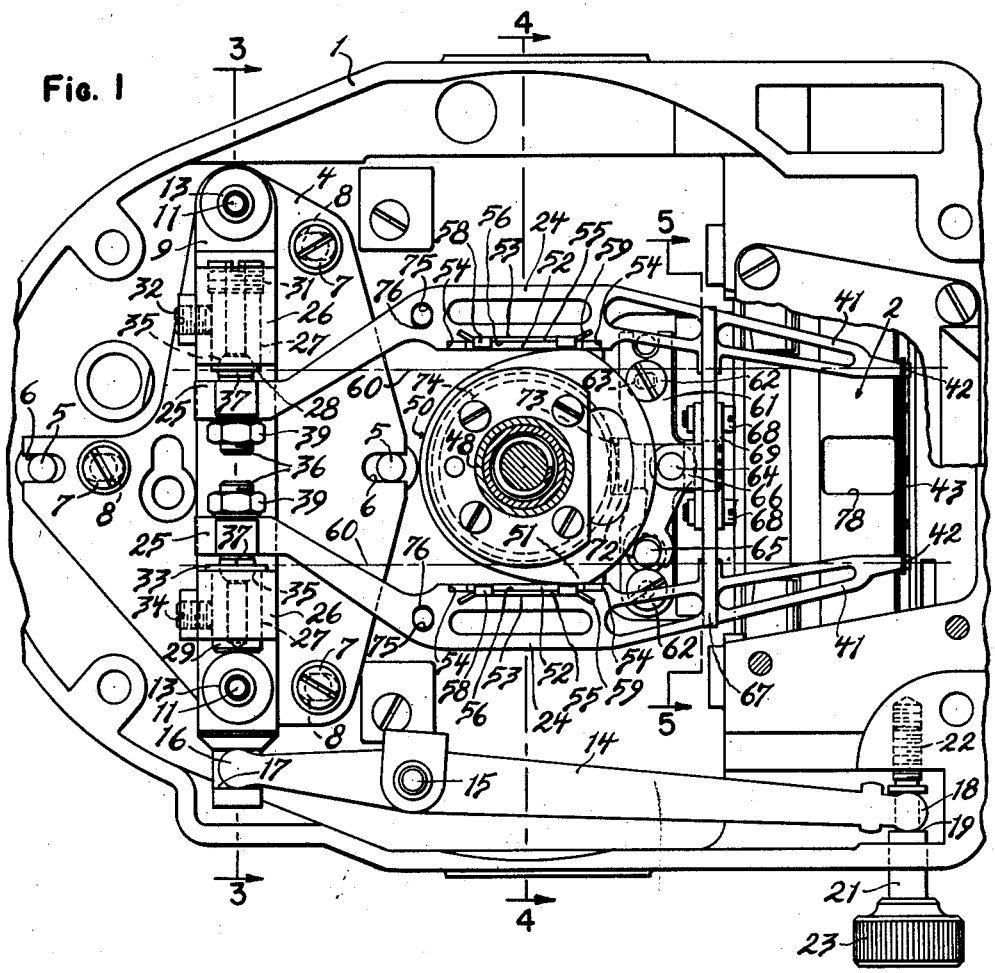
Figure 1 is a partial view in rear elevation of a motion picture projecting machine embodying my invention and having parts removed.

Referring to the drawing, 1 designates a frame, and a vertically extending apertured film feed guide, generally designated at 2, is carried on the frame 1 adjacent one side thereof. See Figures 1 and 2.

A vertically disposed support plate 4 is spaced transversely from the feed guide and is mounted on the frame 1 for adjustment transversely of the feed guide by means of studs 5 on the frame and engaging in slots 6 in the plate and headed screws 7 passing through slots 8 in the plate and screwthreaded into the frame, the slots 6 and 8 extending transversely of the feed guide to provide this adjustment.

A vertically extending support 9, also transversely spaced from the feed guide, is mounted on the support plate 4 for vertical adjustment longitudinally of the feed guide by means of vertically spaced studs 11 on the support plate engaging in vertically elongated apertures 12 through the support 9 and provided with spring friction collar devices 13 retaining the support on the studs, as best shown in Figure 3. A lever 14, see Figures 1 and 3, extends transversely of the feed guide at the lower portion of the frame 1, and is intermediately pivoted, as designated at 15, on a horizontal axis normal to the plane of the feed guide. One end 16 of this lever is slidably and pivotally engaged in a horizontal slot 17 on the lower end portion of the support 9 so that pivotal movement of the lever effects vertical adjustment of the support 9. The other end 18 of the lever 14 is slidably and pivotally engaged in a circumferential groove 19 on a vertically disposed adjusting screw 21 screwthreaded, as designated at 22, into the frame 1 and provided with an exterior knob 23, so that the support 9 may be conveniently adjusted longitudinally of the feed guide by rotation of the screw 21.

A pair of arms 24 extend correspondingly transversely from the feed guide 2 and are spaced longitudinally of the guide, and the guide remote end portions 25 of these arms lie between vertically spaced bearing bosses 26 on the support 9, which are provided with alined vertical bores 27 therethrough. See Figures 1 and 3. Bearing members 28 and 29 are respectively engaged in the bores of the upper and lower bearing bosses 26, the bearing member 28 being screwthreaded into the upper bearing boss, as designated at 31, for vertical adjustment and secured in adjusted position by a set screw 32 and the bearing member 29 being fixedly secured on the lower bearing boss by a flange 33 on this bearing member and engaging this boss and a set screw 34.

The opposing ends of the bearing members 28 and 29 are vertically spaced and are provided with opposing bearing sockets 35 of hemispherical character between which the guide remote arm portions 25 lie, and bearing members 36 are provided with bearing portions 37 of ball character which are respectively engaged in the sockets 35 for universal pivotal movement therein. The shanks of the bearing members 36 are provided with diametrical slots 38 extending from the adjacent ends and terminating at the bearing portions 37 thereof, and the guide remote arm portions 25 are respectively engaged in these slots for adjustment of these bearing members longitudinally of the arms 24 and transversely of the feed guide 2. Nuts 39 are screwthreaded on the shanks of the bearing members 36 and serve to clamp the guide remote arm portions 25 against the bottoms of the slots 38 to secure the bearing members in adjusted position on the arms.

The bearing members 28, 29 and the two bearing members 36 comprise two opposing related ball and socket bearings spaced longitudinally of the feed guide 2 and respectively carrying the guide remote arm portions 25 for pivotal movement of the arms 24 longitudinally and facewise of the feed guide 2, and are operative to oppose relative movement of the guide remote arm portions longitudinally of the feed guide corresponding with separation of the guide adjacent and intermediate portions of the arms, the bearing members 28, 29 and 36 being maintained in engagement in a manner hereinafter appearing.

The guide adjacent end portions 41 of the arms 24 are provided with hook formations 42 facing oppositely longitudinally of the feed guide, see Figures 1, 6 and 7 and a feed shuttle 43 extends longitudinally of the feed guide between the guide adjacent arm portions 41 and is provided with elongated apertures 44 at its ends in which the hook formations 42 are respectively engaged to provide spaced pivotal connections between the guide adjacent arm portions and the shuttle operative to oppose separation of the guide adjacent arm portions, the hook formations 42 providing for assembly of the shuttle with the guide adjacent arm portions. The shuttle is provided with feed teeth 45 spaced longitudinally thereof for cooperation with usual feed perforations 46 of a film 47 in the feed guide 2. See Figures 2 and 7.

Figure 2:
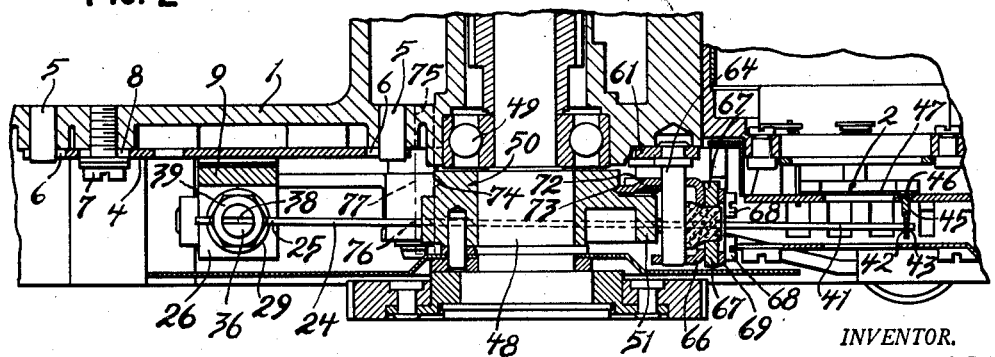
Figure 2 is a partial sectional view of the same taken on a horizontal plane passing through the optical axis of the machine.

A cam shaft 48 is rotatably mounted on the frame 1, by means of bearings one of which is designated at 49, on an axis disposed normal to the plane of the feed guide 2 and between the intermediate portions of the arms 24, see Figures 1, 2 and 4, and a cam member 50 is secured on this shaft for rotation therewith and is provided with a radial cam 51 disposed between the intermediate portions of these arms. This cam is oppositely operative on the intermediate portions of the arms 24 in opposition to movement thereof toward each other, through the medium of bearing members 52 respectively disposed between the arms and cam and having bearing engagement with the cam, for reciprocating the arms and the shuttle 43 longitudinally of the feed guide 2 with rotation of the cam, this reciprocation comprising the film feed and return movements of the arms and shuttle as will be hereinafter described.

For the purpose of minimizing wear the bearing members 52 are formed of material of relatively great wear resistance, preferably a sintered mixture of tungsten carbide and metallic cobalt, and the cam 51 is formed of material of relatively great wear resistance particularly where it is used with bearing members 52 of the above material, the cam 51 being preferably formed of oil impregnated sintered bronze.

Inasmuch as it is difficult to machine a sintered mixture of tungsten carbide and metallic cobalt and that it is practically necessary that it be finally shaped before it reaches its final hardness in the process of manufacture thereof, the bearing members 52 are given a simple shape to facilitate their manufacture, such as the elongated flat rectangular shape thereof as shown, and provision is made for adequately positioning these bearing members on the arms 24 in cooperation with the bearing engagements of the bearing members with the cam 51, which permits of a simple shape of the bearing members, as will now be described.

As shown, the arms 24 are of flat character having their planes disposed correspondingly with their path of movement longitudinally of the guide and normal to the axis of the cam 51, and the edges of the intermediate portions thereof which face the cam 51 are provided with slots 53 forming spaced opposing shoulders 54 in which the bearing members 52 are respectively disposed with their planes disposed transversely of the path of movement of the arms radially of the cam 51. See Figures 1 and 4. Positioning members 55 are respectively engaged in inwardly stepped portions of the slots 53 between the arms 24 and bearing members 52, and each positioning member is provided with oppositely facing correspondingly extending channels 56 and 57 of which the channel 56 is relatively wide and in which the associated bearing member 52 is engaged and of which the channel 57 is relatively narrow and is disposed centrally of the channel 56 and in which the associated arm 24 is engaged.

Thus, the bearing members 52 are adequately positioned on the arms 24, and as shown, the bearing members 52 may rock slightly on the arms 24 in radial planes of the cam 51 to aline their bearing surfaces with the bearing surface of the cam.

The positioning members 55 are preferably formed of sheet metal, see Figure 8, and the wide channels 56 thereof are formed by lugs 58 spaced along the opposite sides of the positioning members and bent in one direction from the main portions thereof to form the channels 56, and the narrow channels 57 are formed by the ends 59 of the main portions of the positioning members being bent in the other direction from the main portions thereof and intermediately slotted in alinement longitudinally of the positioning members to form the channels 57.

Observing that the pivotal bearings of the arms 24, comprising the bearing members 28, 29 and 36 are operative to oppose relative movement of the guide remote arm portions 25 longitudinally of the feed guide 2 corresponding with separation of the guide adjacent arm portions 41 and the intermediate portions of the arms 24, that the pivotal connections of the shuttle 43 with the guide adjacent arm portions are operative to oppose separating movement of the guide adjacent and intermediate arm portions longitudinally of the guide, and that the cam 51 is disposed between the intermediate portions of the arms and is oppositely operative thereon in opposition to movement thereof toward each other, the assembly of these parts is maintained, and vertical adjustment of the bearing member 28 relative to the bearing member 29 provides for relatively adjusting the arms 24 to eliminate lost motion between them and the cam 51.

The cam 51 is operative on the arms 24 in regions outside of the space between two straight lines 60, see Figure 1, one line passing through the pivotal centers of one of these arms and the pivotal connection of the shuttle 43 with this arm and the other line passing through the pivotal centers of the other of these arms and the pivotal connection of the shuttle with this other arm, so that the arms have no tendency to undesirably tilt facewise of their plane of movement longitudinally of the feed guide.

A vertically extending support plate 61 is disposed between the cam shaft 49 and the feed guide 2 and is mounted on the frame 1 by means of vertically spaced headed screws 62 passing through apertures in this support plate and screwthreaded into the frame 1, and the aperture 63 of the support plate through which the upper of these screws passes is elongated transversely of the feed guide 2 so that this support plate is mounted for pivotal adjustment on the axis of the lower screw transversely of the feed guide. See Figures 1 and 2.

The support plate 61 is provided with two vertically spaced bearing studs 64 and 65 which are disposed in parallelism with the cam shaft 49, and a bracket 66 is slidably mounted on the studs 64 and 65 for movement facewise of the feed guide 2. Two elongated vertically extending bearing members 67 are clamped on the bracket 66 at their intermediate portions by means of headed screws 68 passing through apertures in a clamp plate 69 and in these bearing members and screwthreaded into the bracket 66. See Figures 1, 2 and 5. As so mounted on the bracket for movement therewith facewise of the feed guide 2, the bearing members 67 are spaced in a plane facewise of the feed guide in the region of the guide adjacent arm portions 41 of the arms 24 and are provided with vertically extending parallel opposing bearing surfaces 70 forming a bearing slot in which the arms 24 are slidably engaged to position the same facewise of the feed guide and to guide them in their movement longitudinally of the feed guide, the bearing members 67 being adjustable relative to each other to adjust the width of their bearing slot to the thickness of the arms 24 by reason of the apertures 71 through which the clamping screws 68 pass being elongated facewise of the feed guide as shown in Figure 5.

The bracket 66, which carries the bearing members 67, is provided with an extension 72 extending toward the axis of the cam shaft 49 and terminating in a vertically extending cam follower 73 of V shape, and the cam member 50 is provided with an axial cam 74 in the form of a cam groove of V shape in which the cam follower 73 is engaged on a radius of the cams 51 and 74 extending transversely of the feed guide 2 for reciprocating the bearing members 67 and with them the arms 24 and shuttle 43 facewise of the feed guide with rotation of the cam member 50 to engage the shuttle teeth 45 with and to disengage them from feed perforations 46 of the film 47 in the feed guide.

Adjustment of the support plate 61 transversely of the feed guide, by the adjustment means above described, provides for eliminating lost motion between the cam 74 and the cam follower 73.

The cams 51 and 74 are so timed that as they are rotated, the shuttle teeth 45 are engaged with film perforations 46 during movement of the shuttle 43 in one direction longitudinally of the feed guide and are disengaged from the film perforations during movement of the shuttle 43 in the other direction longitudinally of the feed guide to intermittently feed the film 47 in the feed guide as is usual in intermittent feed mechanisms of the reciprocating type.

Adjustment of the support plate 4 transversely of the feed guide 2, provided by the adjustment means between this plate and the frame 1 hereinbefore described, effects adjustment of the pivotal centers of the arms 24 relative to the cam 51 transversely of the feed guide and as a result effects adjustment of the length of the feeding movement of the shuttle 43 to conform it with the spacing of the feed perforations 46 of the film 47 in the feed guide.

However, this adjustment of itself effects adjustment of the shuttle 43 transversely of the feed guide so that the feed teeth 45 of the shuttle may not properly aline with the film perforations transversely of the feed guide. In order to maintain this alinement of the feed teeth of the shuttle with said adjustment of the pivotal centers of the arms 24, the bearing members 36 are adjusted relative to the arms, by the adjustment means between these bearing members and the arms hereinbefore described, longitudinally of the arms and transversely of the feed guide. To facilitate this adjustment of the bearing members 36 relative to the arms with said adjustment of the pivotal centers of the arms, the frame 1 is provided with vertically spaced apertures 75 and the arms 24 are provided with vertically elongated apertures 76 which respectively register with the apertures 75 when the feed teeth of the shuttle are properly positioned transversely of the feed guide. See Figures 1 and 2.

When the plate 4 is to be adjusted, pins 77, one of which is shown in dot and dash lines in Figure 2, are temporarily inserted in the registering apertures 75 and 76 to position the arms 24 transversely of the feed guide, and the nuts 39 having been loosened to permit adjustment of the bearing members 36 relative to the arms, the plate 4 is adjusted. The plate 4 having been adjusted and secured, the nuts 39 are tightened to secure the bearing members 36 with the arms, after which the pins 77 are removed.

The adjustments of the support plate 61 and the support plate 4 relative to the frame 1 and of the bearing members 36 relative to the arms 24 are factory or service adjustments.

Adjustment of the support 9 vertically or longitudinally of the feed guide 2 results in corresponding adjustment of the pivotal centers of the arms 24 by reason of the bearing members 28 and 29 being carried on the support 9, and effects bodily adjustment of the feeding movement of the shuttle 43 longitudinally of the feed guide for "framing" or registering the pictures on the film with the aperture 78 of the feed guide, which adjustment is made during operation of the mechanism and is conveniently effected by manual rotation of the knob 23.

While I have thus described my invention, I do not wish to be limited to the precise details described, as changes may be readily made without departing from the spirit of my invention, but having thus described my invention, I claim as new and desire to secure by Letters Patents the following:

1. In an intermittent strip feed mechanism, the combination of a support, of a pair of arms extending correspondingly transversely from and spacedly related longitudinally of a strip feed guide, bearing means carrying the guide remote end portions of said arms on said support for pivotal movement longitudinally and facewise of said guide, a toothed strip feed shuttle extending between and having spaced pivotal connections with the guide adjacent end portions of said arms for movement therewith, additional bearing means operative on said arms in the region of said guide adjacent arm portions to position said arms facewise of said guide and guide said arms in their movement longitudinally of said guide and mounted on said support for movement facewise of said guide, and actuating means for reciprocating said arms and additional bearing means respectively longitudinally and facewise of said guide in timed relation and comprising a rotary radial cam disposed on an axis generally normal to the plane of said guide and between the intermediate portions of said arms and oppositely operative thereon and a rotary axial cam disposed in coaxial relation and angularly fixed with said radial cam and operative on said additional bearing means.

2. In an intermittent strip feed mechanism, the combination of a support, a pair of arms extending correspondingly transversely from and spacedly related longitudinally of a strip feed guide, bearing means carrying the guide remote end portions of said arms on said support for pivotal movement of said arms longitudinally and facewise of said guide and operative to oppose relative movement of said guide remote end portions longitudinally of said guide correspondingly with separation of the guide adjacent end and intermediate portions of said arms, a toothed strip feed shuttle extending between and having spaced pivotal connections with said guide adjacent arm portions for movement therewith and operative to oppose separating movement of said guide adjacent arm portions longitudinally of said guide, additional bearing means of bearing slot character extending longitudinally of said guide in the region of said guide adjacent arm portions and in which said arms are slidably engaged to position the same facewise of said guide and to guide them in their movement longitudinally of said guide and mounted on said support for movement facewise of said guide, and actuating means for reciprocating said arms and additional bearing means respectively longitudinally and facewise of said guide in timed relation and comprising a rotary radial cam disposed on an axis generally normal to the plane of said guide and between said intermediate arm portions and oppositely operative thereon in opposition to movement thereof toward each other, a rotary axial cam disposed in coaxial relation and angularly fixed with said radial cam, and a cam follower carried with said additional bearing means and having engagement with said radial cam.

3. In an intermittent strip feed mechanism, the combination of claim 2 and further characterized in combination, and said radial cam being operative on said arms in regions outside of the space between two straight lines one line passing through the pivotal centers of one of said arms and the pivotal connection of said shuttle with this arm and the other line passing through the pivotal centers of the other of said arms and the pivotal connection of said shuttle with this other arm.

4. In an intermittent strip feed mechanism, the combination of a support, a pair of arms extending correspondingly transversely from and spacedly related longitudinally of a strip feed guide, bearing means carrying the guide remote end portions of said arms on said support for pivotal movement of said arms longitudinally of said guide and operative to oppose relative movement of said guide remote arm portions longitudinally of said guide correspondingly with separation of the guide adjacent end and intermediate portions of said arms including adjustment means operative to provide adjustment of the pivotal centers of said arms longitudinally of said guide, a toothed feed shuttle extending between and having spaced pivotal connections with said guide adjacent arm portions for movement therewith operative to oppose separation of said guide adjacent arm portions longitudinally of said guide and comprising oppositely related hook formations providing for assembly of said shuttle with said guide adjacent arm portions, and a rotatory actuating member disposed between and oppositely operative on said intermediate arm portions in opposition to movement of said arms toward each other to reciprocate said arms longitudinally of said guide.

5. In an intermittent strip feed mechanism, the combination of claim 4 and further characterized in combination, and said rotatory actuating member being operative on said arms in regions outside of the space between two straight lines one passing through the pivotal centers of one of said arms and the pivotal connection of said shuttle with this arm and the other line passing through the pivotal centers of the other of said arms and the pivotal connection of said shuttle with this other arm.

6. In an intermittent strip feed mechanism, the combination of claim 2 and further characterized in combination, said first mentioned bearing means comprising two opposingly related ball and socket bearings spaced longitudinally of said guide and respectively carrying said guide remote arm portions and adjustment means operative to provide relative adjustment of the pivotal centers of said arms longitudinally of said guide, said shuttle and guide adjacent arm portion pivotal connections comprising oppositely related hook formations providing for assembly of said shuttle with said guide adjacent arm portions, and said radial cam being operative on said arms in regions outside of the space between two lines one line passing through the pivotal centers of one of said arms and the pivotal connection of said shuttle with this arm and the other line passing through the pivotal centers of the other of said arms and the pivotal connection of said shuttle with this other arm.

7. In an intermittent strip feed mechanism, the combination of claim 2 and further characterized in combination, said first mentioned bearing means comprising two opposingly related ball and socket bearings spaced longitudinally of said guide and respectively carrying said guide remote arm portions and adjustment means operative to provide relative adjustment of the pivotal centers of said arms longitudinally of said guide, and additional adjustment means operative between said support and first mentioned bearing means to provide adjustment of said first mentioned bearing means longitudinally of said guide.

8. In an intermittent strip feed mechanism, the combination of claim 2 and further characterized in combination, the mounting of said additional bearing means on said support comprising adjustment means operative to provide adjustment of said bearing means transversely of said guide, and the engagement of said axial cam and follower being of V character on a radius of said cams extending transversely of said guide.

9. In an intermittent strip feed mechanism, the combination of a support, an arm extending transversely from a strip feed guide, toothed strip feed means carried with the guide adjacent end of said arm, a bearing carrying the guide remote end portion of said arm for pivotal movement longitudinally of said guide and comprising pivotally engaged bearing members respectively carried with said support and arm, a rotatory actuating member operative on the intermediate portion of said arm for reciprocating the same longitudinally of said guide, adjustment means operative between said support and support carried bearing member to provide adjustment of this bearing member transversely of said guide, and a second adjustment means operative between said arm and arm carried bearing member to provide adjustment of this bearing member relative to said arm transversely of said guide.

10. In an intermittent strip feed mechanism, the combination of claim 9 and further characterized in combination, and a third adjustment means operative between said support and support carried bearing member to provide adjustment of this bearing member longitudinally of said guide.

11. In an intermittent strip feed mechanism, the combination of a reciprocable member, a rotatory actuating member for reciprocating said reciprocable member, a bearing member disposed between said reciprocable and actuating members and having slide bearing engagement with said actuating member, and positioning means on said reciprocable member and operative in cooperation with said bearing engagement to position said bearing member on said reciprocable member and providing a recess facing said actuating member and in which said bearing member is seated and retained against movement laterally of said bearing engagement.

12. In an intermittent strip feed mechanism, the combination of a reciprocable member, a rotatory actuating member for reciprocating said reciprocable member, a bearing member disposed between said reciprocable and actuating members and having slide bearing engagement with said actuating member, and positioning means on said reciprocable member and operative in cooperation with said bearing engagement to position said bearing member on said reciprocable member and providing a recess facing said actuating member and in which said bearing member is seated against movement laterally of said bearing engagement and comprising a positioning member between said bearing and reciprocable members and having shoulder engagements with said reciprocable and bearing members laterally of said bearing engagement.

13. In an intermittent strip feed mechanism, the combination of a reciprocable member of flat character having its plane disposed correspondingly with its path of movement, a rotatory actuating member for reciprocating said reciprocable member, a bearing member of flat character disposed between said reciprocable and actuating members with its plane disposed transversely of said path of movement, and positioning means on said reciprocable member and operative in cooperation with said bearing engagement to position said bearing member on said reciprocable member and providing a recess facing said actuating member and in which said bearing member is seated against movement laterally of said bearing engagement and comprising a slot at the edge of said reciprocable member which faces said actuating member and forming spaced opposing shoulders and in which said bearing member is engaged and a positioning member engaged in said slot between said reciprocable and bearing members and provided with oppositely facing correspondingly extending channels one of which is relatively wide and in which said bearing member is engaged and the other of which is relatively narrow and is disposed centrally of said wide channel and in which the associated arm is engaged.

14. In an intermittent strip feed mechanism, the combination of a support, a pair of arms extending correspondingly transversely from and spacedly related longitudinally of a strip feed guide, bearing means carrying the guide remote end portions of said arms on said support for pivotal movement of said arms longitudinally and facewise of said guide, a toothed strip feed shuttle extending between and having spaced pivotal connections with the guide adjacent end portions of said arms for movement therewith, additional bearing means operative on said arms in the region of said guide adjacent arm portions to position said arms facewise of said guide and guide said arms in their movement longitudinally of said guide and mounted on said support for movement facewise of said guide, actuating means for reciprocating said arms and additional bearing means respectively longitudinally and facewise of said guide in timed relation and comprising a rotatory actuating member disposed between and oppositely operative on the intermediate portions of said arms, said first mentioned bearing means comprising two opposingly related bearings spaced longitudinally of said guide and respectively carrying said guide remote arm portions on said support and each bearing comprising pivotally engaged bearing members respectively carried with said support and one of said arms, second and third supports respectively adjustably mounted on said first mentioned support and said second support one for adjustment transversely and the other for adjustment longitudinally of said guide and said third support having the support carried bearing members of said bearings mounted thereon, and adjustment means operative between said arms and arm carried bearing members of said bearings to provide adjustment of these bearing members relative to said arms transversely of said guide.

BRUNO STECHBART.

REFERENCES CITED

The following references are of record in the file of this patent:

UNITED STATES PATENTS

| Number | Name | Date |
| --- | --- | --- |
| 1,825,254 | Victor | Sept. 29, 1931 |
| 2,106,115 | Debrie | Jan. 18, 1938 |